(12) United States Patent
Medel

(10) Patent No.: US 7,025,407 B2
(45) Date of Patent: Apr. 11, 2006

(54) MINING HOPPER MADE UP OF STEEL AND POLYMERS

(76) Inventor: Manuel Antonio Medel, Enrique Foster Sur No. 39, Piso 11, Las Condes, Santiago (CL)

(*) Notice: Subject to any disclaimer, the term of this patent is extended or adjusted under 35 U.S.C. 154(b) by 217 days.

(21) Appl. No.: 10/690,723

(22) Filed: Oct. 22, 2003

(65) Prior Publication Data
US 2005/0093338 A1 May 5, 2005

(30) Foreign Application Priority Data
Apr. 30, 2003 (CL) .................................. 73-2003

(51) Int. Cl.
*B62D 33/02* (2006.01)

(52) U.S. Cl. .................... 296/183.2; 296/181.3; 296/184.1

(58) Field of Classification Search .......... 296/183.2, 296/181.3, 183.1, 184.1, 39.2
See application file for complete search history.

(56) References Cited

U.S. PATENT DOCUMENTS

| | | | | |
|---|---|---|---|---|
| 4,116,485 A | * | 9/1978 | Svensson | 296/39.1 |
| 5,803,531 A | * | 9/1998 | Nielsen | 296/183.2 |
| 6,022,068 A | | 2/2000 | D'Amico | |
| 6,068,927 A | | 5/2000 | Stenman | |
| 6,286,884 B1 | * | 9/2001 | Speece | 296/39.2 |
| 6,481,785 B1 | * | 11/2002 | Coleman et al. | 296/183.2 |
| 2002/0074848 A1 | | 6/2002 | Azocar | |

* cited by examiner

*Primary Examiner*—Jason Morrow
(74) *Attorney, Agent, or Firm*—Millen, White, Zelano & Branigan, P.C.

(57) ABSTRACT

A structure, box or hopper for transportation which is formed from a combination of polymers and steels. In one embodiment, polymers comprise the body of the hopper which is in direct contact with the load being transported. In this way, the polymers bear the impact and wear and tear caused by the material being transported. The present invention further comprises various systems for fastening the steel portion of the hopper to the polymeric portion including the use of adjustable elastomeric ropes for supporting a weight bearing rubber mat.

14 Claims, 11 Drawing Sheets

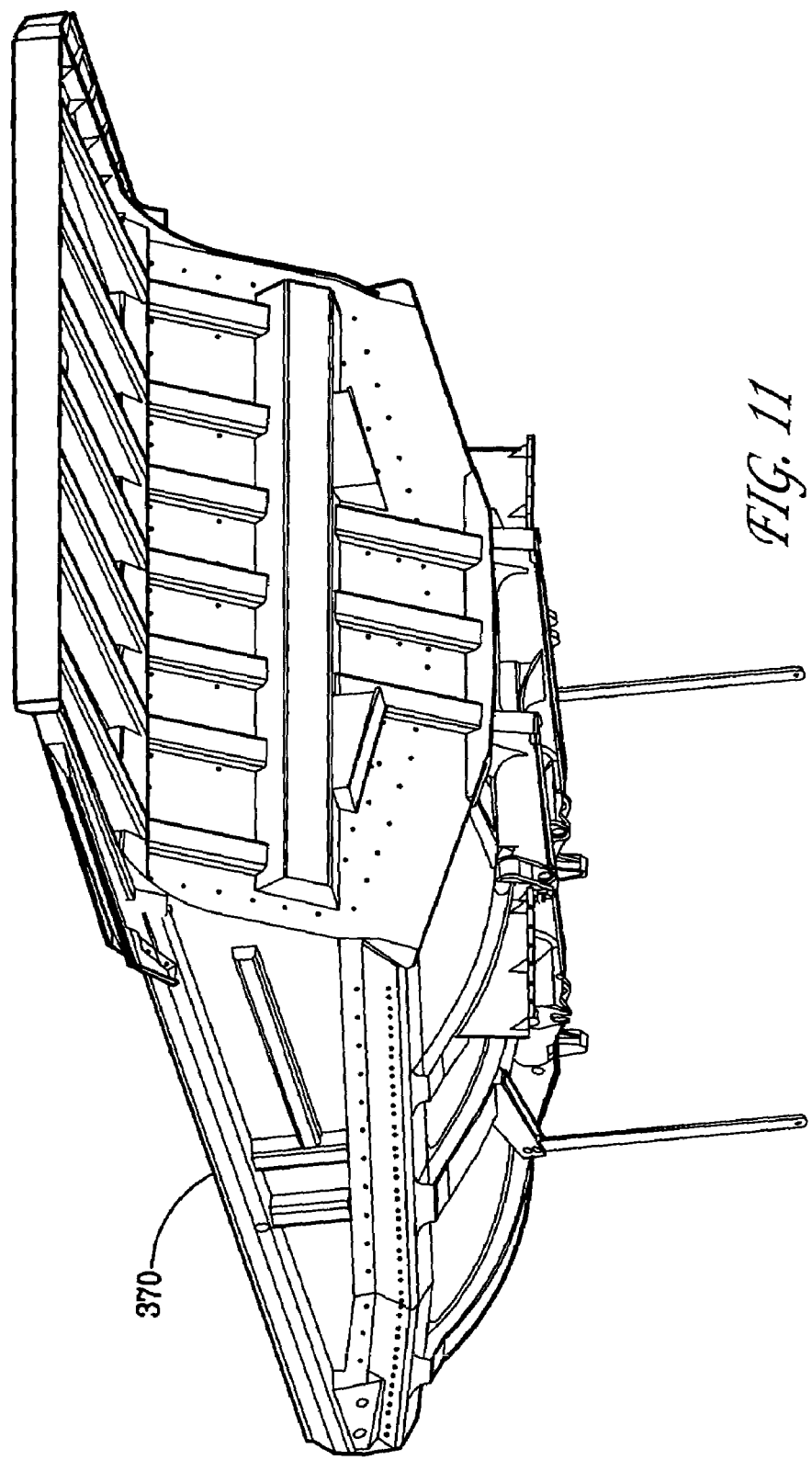

MINING HOPPER MADE UP OF STEEL AND POLYMERS

This application is based on Application No. 873-2003, filed in Chile on Apr. 30, 2003, the contents of which are hereby incorporated by reference.

FIELD OF THE INVENTION

The present invention relates to structures used for the transportation of goods and more particularly to compositions and constructions for such structures.

BACKGROUND OF THE INVENTION

There are, at present, many forms of structures which are employed as containers, receiving boxes and/or hoppers for mining, construction and for other activities involving the transportation of rocks, gravel and ballast from mining deposits or in connection with other industrial activities. These structures are often deployed under various and sometimes very difficult geographic and weather conditions. The variability of the material transported and the surrounding environment can create additional difficulties. For example, materials can vary based upon, among other things, weight, chemical composition and adhesion. Environmental factors such as temperature and humidity also come into play.

In general, the design and construction of these boxes or containers do not specifically address the particular characteristics of the application for which the they are intended. For example, design and construction does not generally take into account the weight or adhesion of the material to be transported or the environment in which such containers or boxes are to be used. Most designs differ only by the particular shape, and such designs are based on technical specifications and design parameters that have not significantly varied over time. Similarly, the type of material with which such structures are built has not significantly changed over the years. These structures are and have been almost exclusively formed from steel in its different formats and characteristics.

On the other hand, industrial activity in general, and construction activity and mining applications in particular have changed over the years in response to, among other things, a global drive to reduce operating costs by investing in and developing programs leading to processes and inputs with the greatest technological advantage, which may in turn lead to a lower cost for products and services and towards environment-friendly solutions.

The great distances to be traveled by trucks when transporting ore for processing and storing require a strong and generally wear resistant structure for holding the material. Additionally, quality and safety and the efficacy and durability of the structure for holding various materials including ore are currently critical to overall success in these specific lines of business.

At present, the aforementioned structures, container boxes and hoppers are for the most part built entirely with steel plates. The steels used are of different strengths and thicknesses which together and in various combinations make up the universe of available structures. Unfortunately with this approach, various drawbacks exist with respect to particular applications. One particular problem is the resulting non-uniform distribution of the material transported over the structure's body which eventually generates an excess wear of the truck's tires. Another unsolved problem is the effect of the stresses on the steel due to impact and abrasion conditions, both in the filling and pouring of materials into the container boxes. Problems that can arise during filling operations can result in time and resources being lost due to the required maintenance processes designed to enhance the life of the structures as well ensure safety and other desirable operating characteristics.

Additionally, design problems and the nature of steel as a material typically results in large numbers of impacts high degrees of noise resulting during loading and transport. Also, depending on the external environment and the material's humidity content, with current steel hoppers, the material transported can sometimes become bonded or adhered to the steel structure of the hopper, thus dramatically reducing efficiency in connection with the unloading of the material. Regular maintenance work is required to be performed on these steel structures as a result of damages from impacts and abrasion to the metal surfaces.

SUMMARY OF THE INVENTION

It is thus a primary object of the present invention to provide a structure or box for transport which overcomes many of the deficiencies found in the prior art. A preferred from of the structure of the present invention is embodied as a box or hopper for transportation. Instead of being manufactured entirely of steel, the container of the present invention is formed as a mixed structure of polymers and steels. In this way, polymers form the body of the hopper at the portion where the load resides. As a result, the impact and wear and tear caused by the material transported is borne by the polymer portion of the structure which is, in turn, incorporated with the structure's steel portion through various systems and methodologies for fastening, adjusting and suspension as disclosed herein. The metal portion of the structure, on the other hand, acts as a fastening and supporting element for the polymeric component and is not subject to wear and tear and impacts resulting from the material to be transported.

BRIEF DESCRIPTION OF THE DRAWINGS

FIG. 11 is an illustration of the side and front walls of the hopper of the present invention.

DETAILED DESCRIPTION OF INVENTION

The present invention for a novel mining hopper is now described. In the description that follows, numerous specific details are set forth for the purposes of explanation. It will, however, be understood by one of skill in the art that the invention is not limited thereto and that the invention can be practiced without such specific details and/or substitutes therefor. The present invention is limited only by the appended claims and may include various other embodiments which are not particularly described herein but which remain within the scope and spirit of the present invention.

Figure 1:
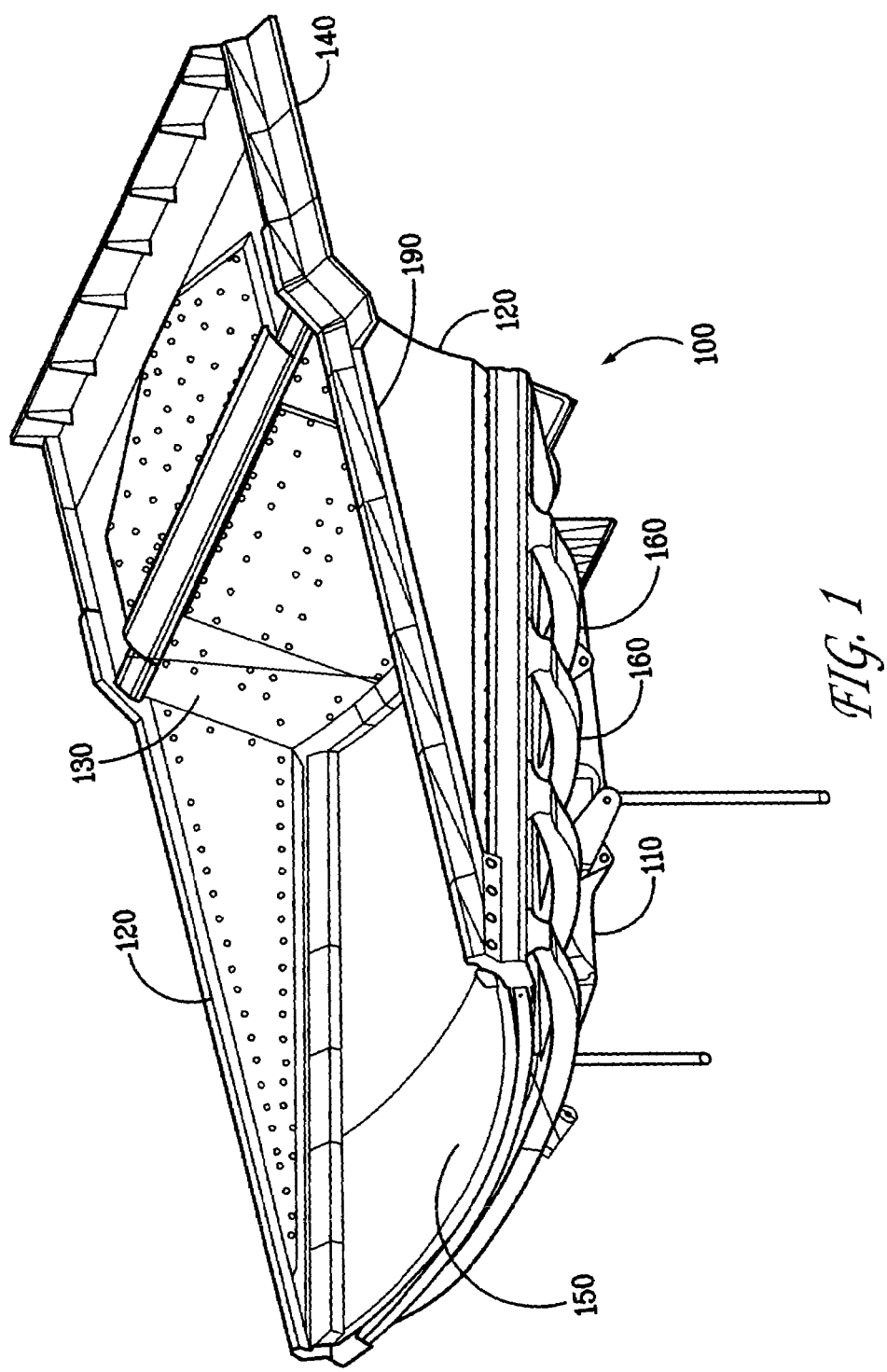
FIG. 1 is an illustration of the hopper of the present invention.

According to the present invention, and as generally illustrated in FIG. 1, a structure 100, such as, for example, a mining hopper, for transporting materials, is built from multiple materials wherein polymers form a significant portion of the total structure. According to one preferred embodiment, portions of structure 100 such as the bottom 110, side walls 120, front section 130, visor 140 and other external areas are manufactured from polymers or a combination of steel parts and polymers.

In a preferred embodiment, structure 100 includes a floor 150 for the storage of material. This floor 150 is formed as a rubber mat 150 hanging on a plurality of elastomeric ropes 160, which after being placed parallel to each other, adjust to the shape of the side walls 120 of structure 100 via a fastening system (not shown) made up of clamps and bolts, so that the stress on ropes 160 can be controlled. Hanging rubber mat 150 is preferably a single body and is manufactured using polymers which are selected to be resistant to abrasion and impacts.

Figure 2:
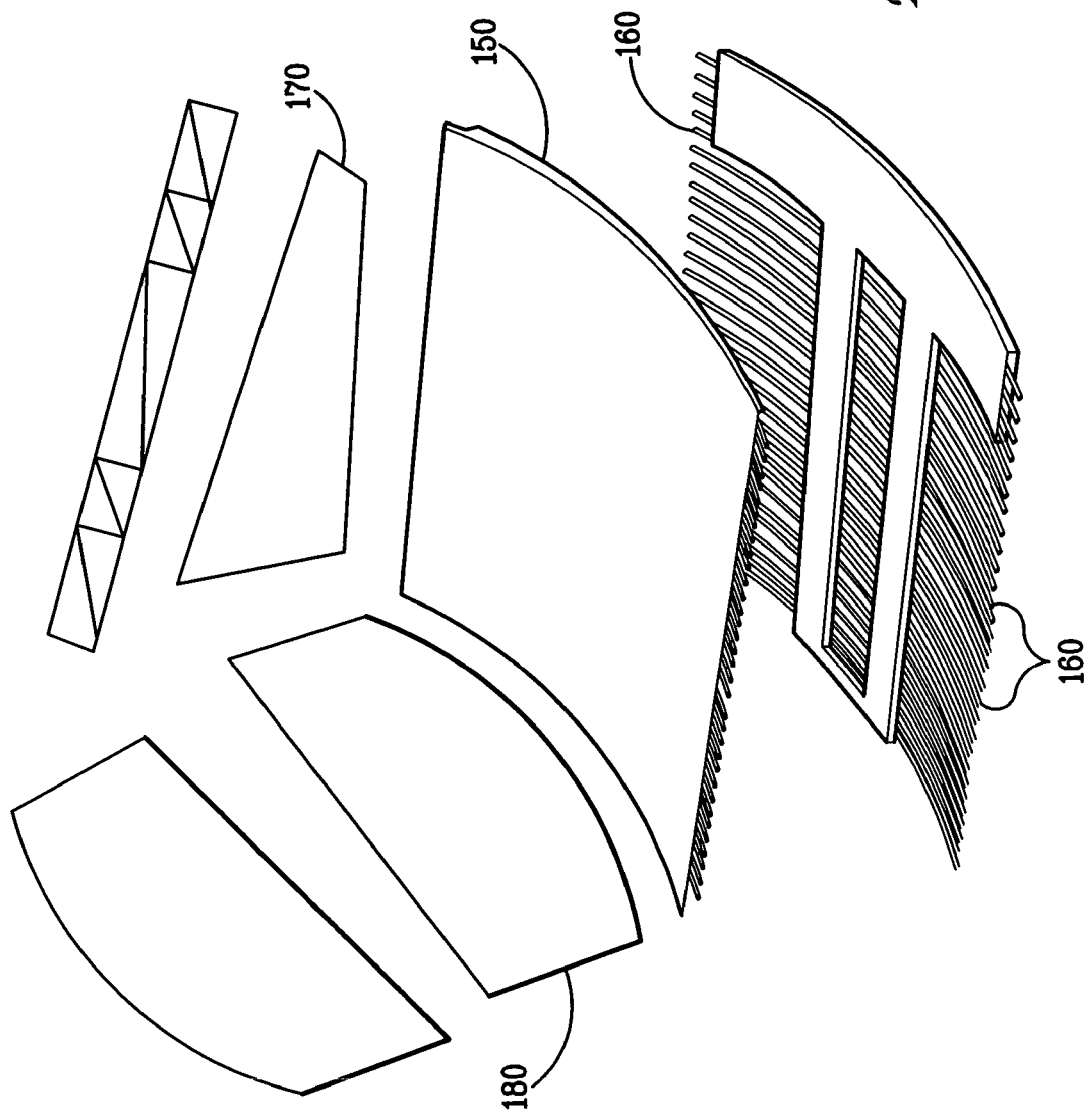
FIG. 2 is an illustration of the rubber parts of the hopper of the present invention.
Figure 3:
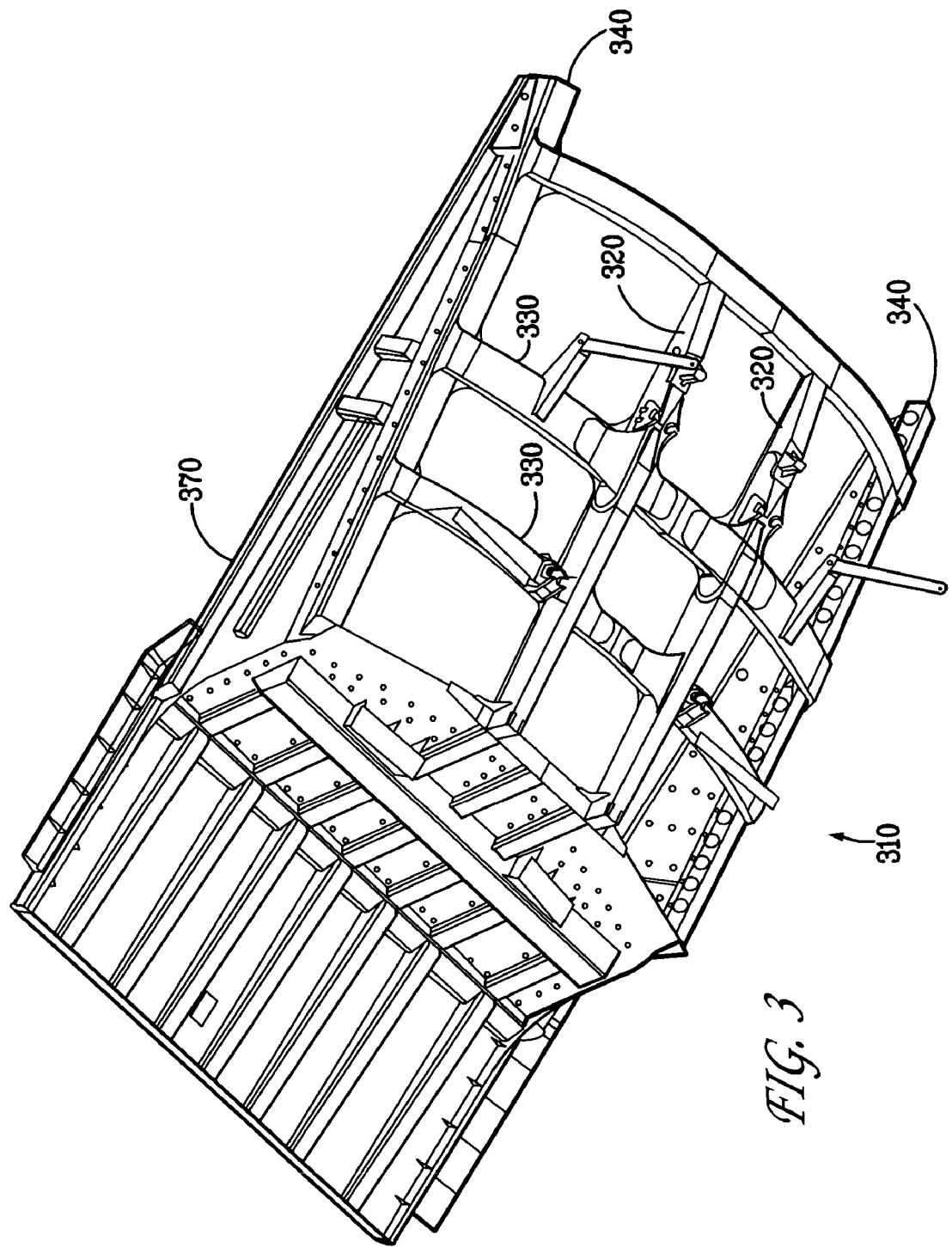
FIG. 3 is an illustration of the longitudinal and transversal beams of the hopper of the present invention.

FIG. 2 illustrates mat 150 and associated components in greater detail. The thickness of mat 150 can vary depending upon the application but is preferably determined according to the area bearing the greatest impact and abrasion stress required by the different applications. The steel components of structure 100 act as a supporting and fastening element. As can be seen from FIG. 2 and as discussed in greater detail below, various other rubber mat sections may be included to protect the metal portion of the hopper of the present invention Referring to FIGS. 3 and 4, frame 310 is constructed in a preferred embodiment using a series of longitudinal, straight beams 320 separated from each other by the distance equal to the beams of the truck chassis. Frame 310 may be square shaped, rectangular or some other shape as required or desirable based upon the truck chassis and other factors. Additionally, frame 310 includes a plurality of transverse beams 330 which are placed equidistant from one another and perpendicular to longitudinal beams 320.

Figure 5:
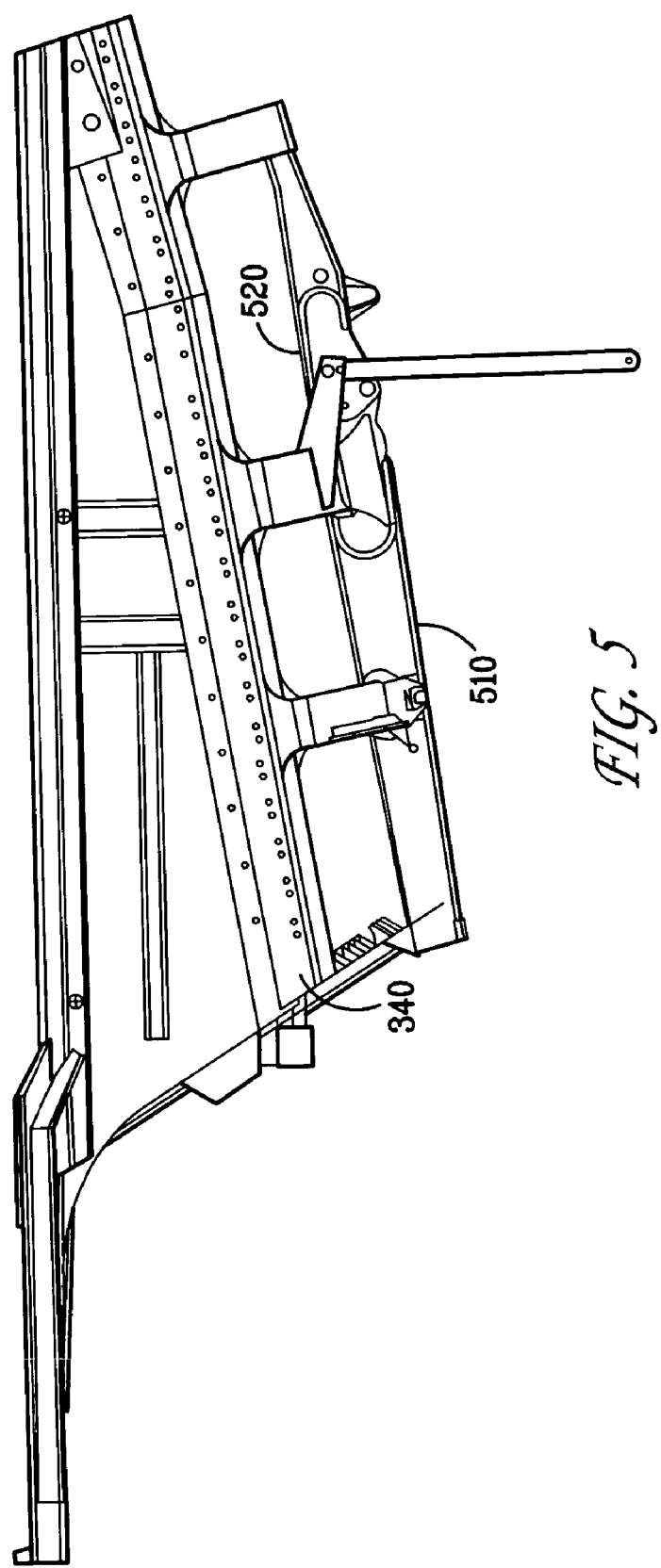
FIG. 5 is a side view of the hopper of the present invention illustrating the beams which act as housing for ropes and the fastening system.

In a preferred embodiment, the two ends of the transverse beams 330 are supported by two additional longitudinal beams 340 which are parallel to and of the same length as longitudinal beams 320. Additional longitudinal beams 340, in turn, accommodate round or square cavities (see FIG. 5) which house the adjustment and supporting mechanism 520 for the rubber guy cables 510 which support rubber hanging mat 150 of the hopper structure 100.

Figure 6:
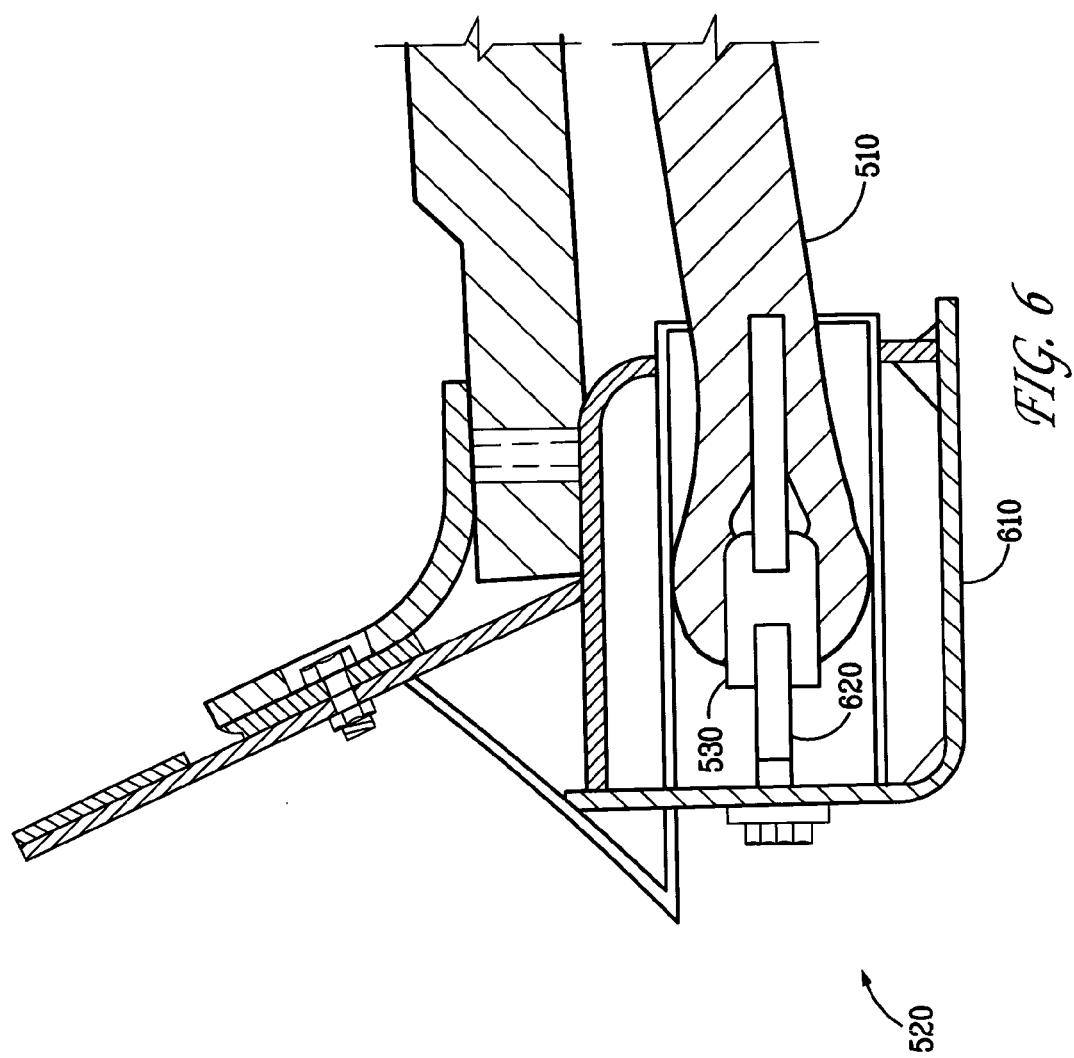
FIG. 6 is a close-up view of the fastening system of the present invention.

Referring to FIG. 6, it may been seen that fastening and supporting mechanism 520 may be made up of a metal plate box 610 with a hole in the outer end, which houses an adjustment bolt 620 screwed to a metal latch 530 to support the rubber cables 510 on each end, which in turn supports the mat 150 forming the bottom of hopper structure 100.

Frame 310 is set within steel support structure 370 which comprises three walls: front wall 130 and side walls 120 (see FIG. 1). Side walls 120 may be of a substantially triangular shape reinforce in the upper edge by a pentagonal steel beam, which runs the whole length of front wall 130 and houses in its upper portion rubber blocks 190 which make up a protecting side edge for the top of side walls 120. Side walls 120 are located over longitudinal beams 340 which, in turn, house fastening and supporting system 520. Fastening and supporting system 520 may contain a plurality of small holes which allow for bolt fastening of the side wall rubber mats 170 which cover the surface of both side walls 120 and which provide the function of shielding side walls 120 against impacts and abrasion.

Front wall 130, may be built from steel and is located in the front end of structure 100, and may have a hyperbolic hexagonal base and rectangular shape reinforced in its outer face by a set of C cross-section horizontal and vertical beams. Front wall 130 may contain a variable number of small holes on its surface which allow for the use of fastening bolts in order to place rubber mat 180 which protects front wall 130. In a preferred embodiment, rubber mat 180 is formed as a single piece with a continuous thickness.

Both front wall 130 and side walls 120 contain fastening metal structures in their lower ends, which with their holes, allow for fastening protection plates over the front and longitudinal end of the rubber mats. To the upper end of front wall 130, a metal plate which projects to front wall 130 may be provided to act as a visor to protect the front portion of the truck against possible falling or displacement of the material transported, This steel visor 140 is made up of a low-thickness steel plate reinforced in its lower part with longitudinal and transversal beams of the C type and covered on its surface by rubber mat 180 made up of a single continuous thickness piece and fastened with bolts and performing the function of covering the steel area (see FIGS. 1 and 2).

As mentioned above, the thickness of rubber mat 150 which acts as the bottom is variable and determined according to the area where the impact and abrasion is greatest in the different applications required. This same characteristic may be employed to construct the rear portion or final third of the hanging rubber mats 180 and 170 wherein a greater thickness or volume and with a tilting degree not over 20% allows the formation of a better filling cone, thus enabling a better and more efficient filling of the hopper 100. This further avoids spillage of the material transported.

In order to analyze the design of the hanging rubber mats 170 and 180, the theory of the maximum deformation energy is employed. According to this theory, it is expected that the fault caused by fluency occurs when the total deformation energy of a unit volume is equal to or exceeds the deformation energy value of the same volume corresponding to the flow strength in stress or compression. From this, it is derived that the polymer behaves as just one resisting body. Also, the turning force of the vehicle holding transporting structure 100 is absorbed by hanging rubber mats 170 and 180 and scattered among the complete structure via elastomeric ropes 160. Also, shock loads are substantially dampened as the rubber mats acts as "hammock". Consequently, the traditional concept of supporting and resisting the hopper in the process of loading, unloading and transporting is dramatically changed, since the weight of the material transported, as well as the wear produced by the load transported, wholly lies in the rubber structures and the elastomeric ropes 160, while the steel portion of structure 100, acts only as a support for the polymers and not as a wear element.

Figure 7:
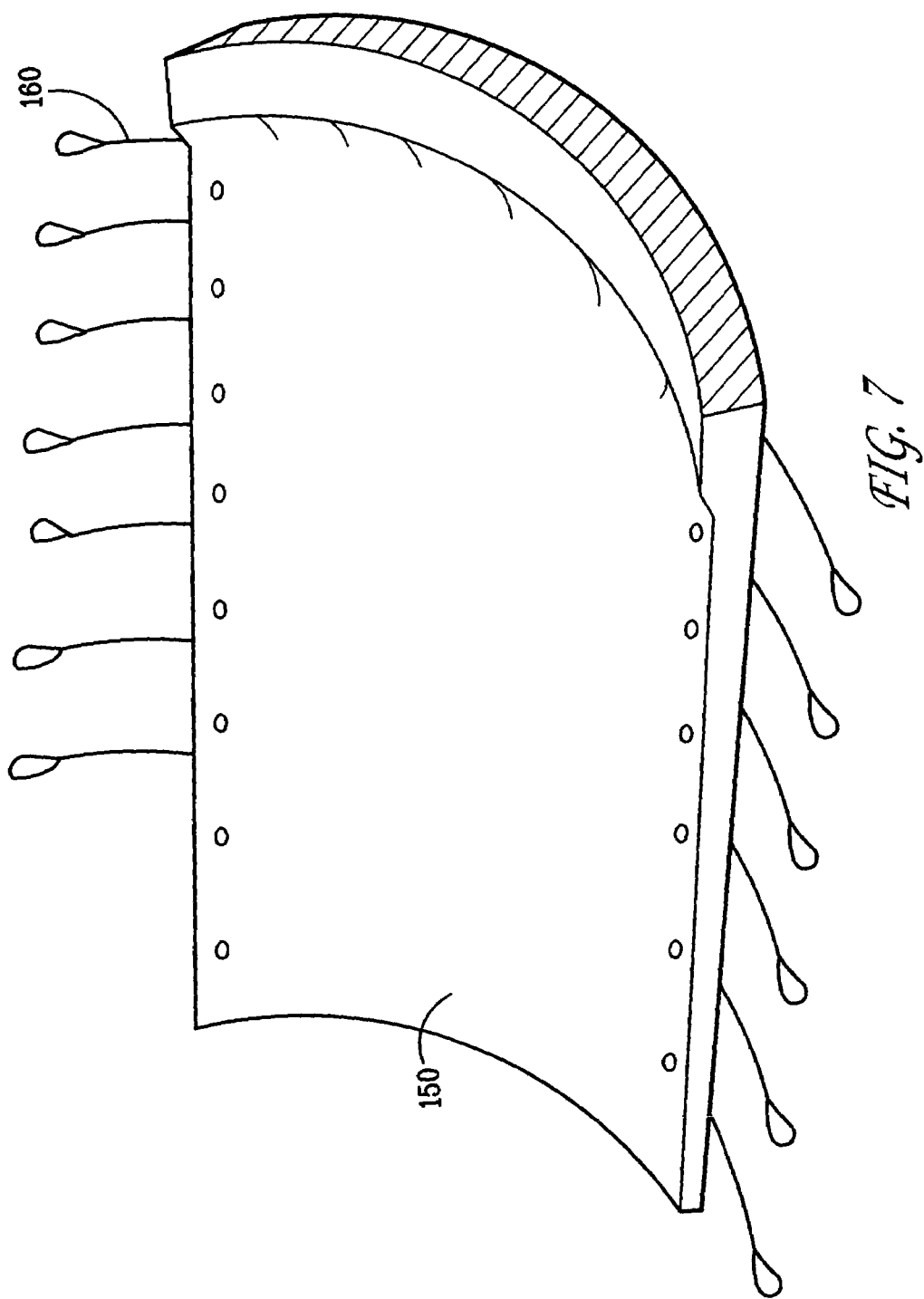
FIG. 7 is an illustration of the rubber bottom of the hopper of the present invention with specific indication of its volume increase towards the rear or back portion.
Figure 8:
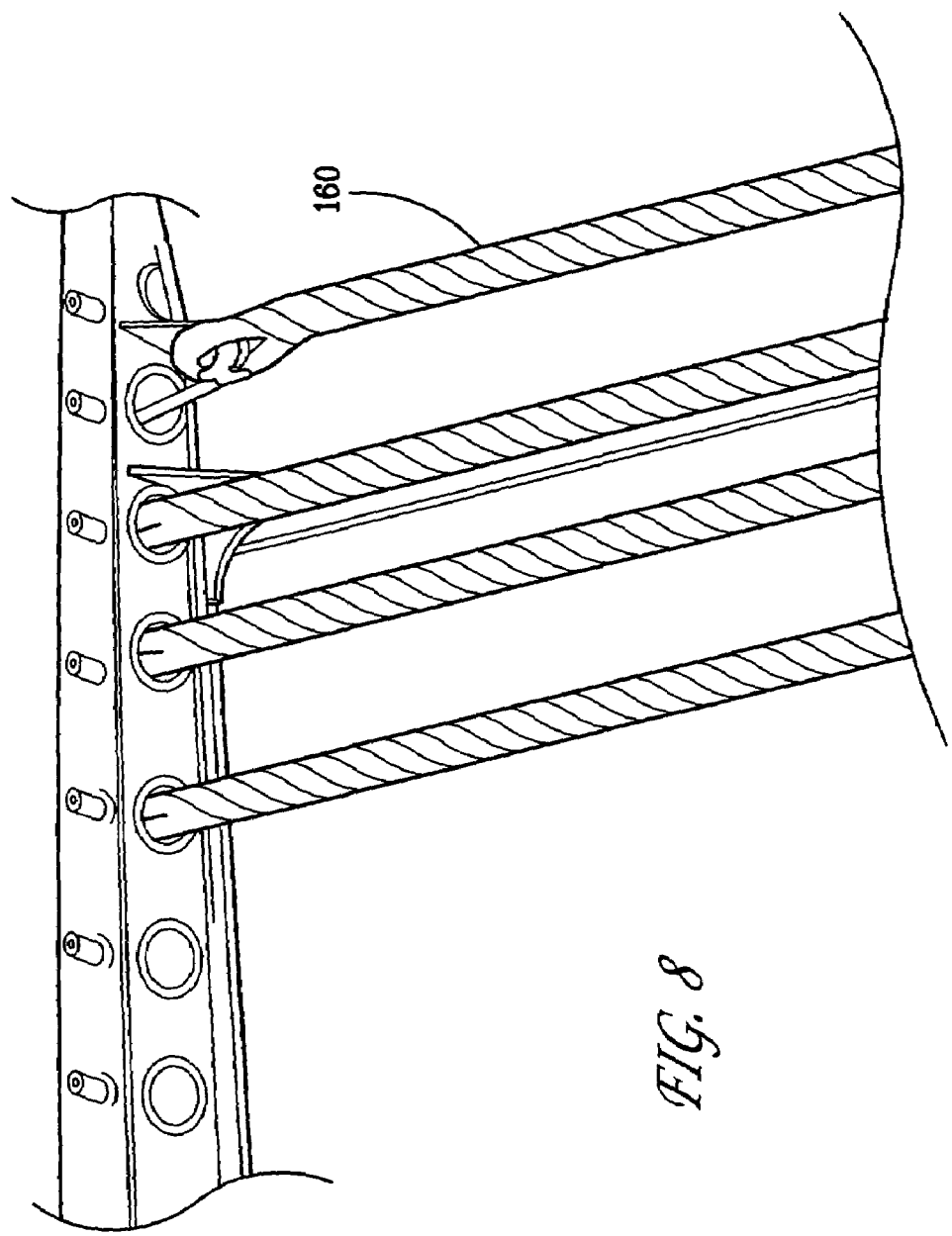
FIG. 8 is an illustration of the ropes and related portions of the fastening system of the present invention.
Figure 9:
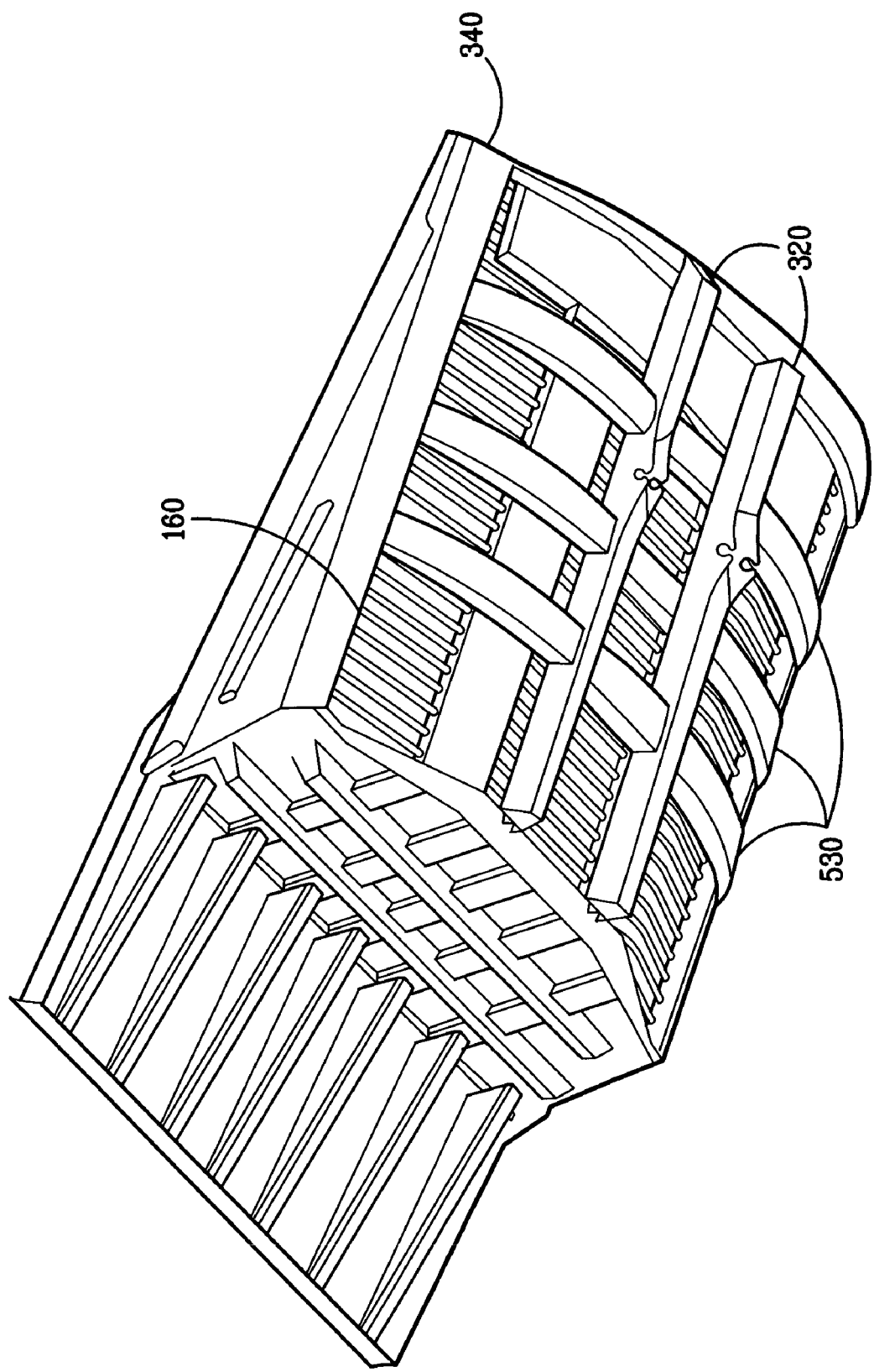
FIG. 9 is an illustration of ropes on the lower part of the hopper of the present invention.

Rubber mat 150 hangs over ropes or strings 160 manufactured as polyester fibers covered with rubber. Each of these ropes 160 may be individually adjusted relative to the supporting structure, thus allowing for the presence of a nominal distance between rubber mat 150 and the lower steel structure of structure 100, which situation allows for simple and safe maintenance (See FIGS. 7 and 8). In order to provide the necessary elasticity, all ropes 160 are oriented parallel to one another, thus allowing that these may endure some narrowing during the loading process and even return to their original length when structure 100 is emptied. Ropes 160 are fastened to structure 100 through a mechanism which in turn allows for the fastening and stress adjustment of each component (See FIGS. 6, 8 and 9).

At the bottom of structure 100, the front section or the inside front wall of the hopper is covered with rubber and fastened to the rubber bottom by mechanical fastening or blocks made up of steel or rubber in order to protect the joints against impacts and abrasion. The front rubber mat 180 covers the inner front section of the hopper thus allowing for the reduction of the thickness of the steel used in this section and provides for front rubber mat 180 absorbing all impact and abrasion. In one embodiment of the present invention, removable and adjustable rubber blocks are mechanically placed in different outer sectors of the container box body, so that they may shield and/or dampen of the material which may fall or come out of the container box, with the clear benefit of protection for the box, tires, the cabin of the truck and the operator of the unit.

Figure 4:
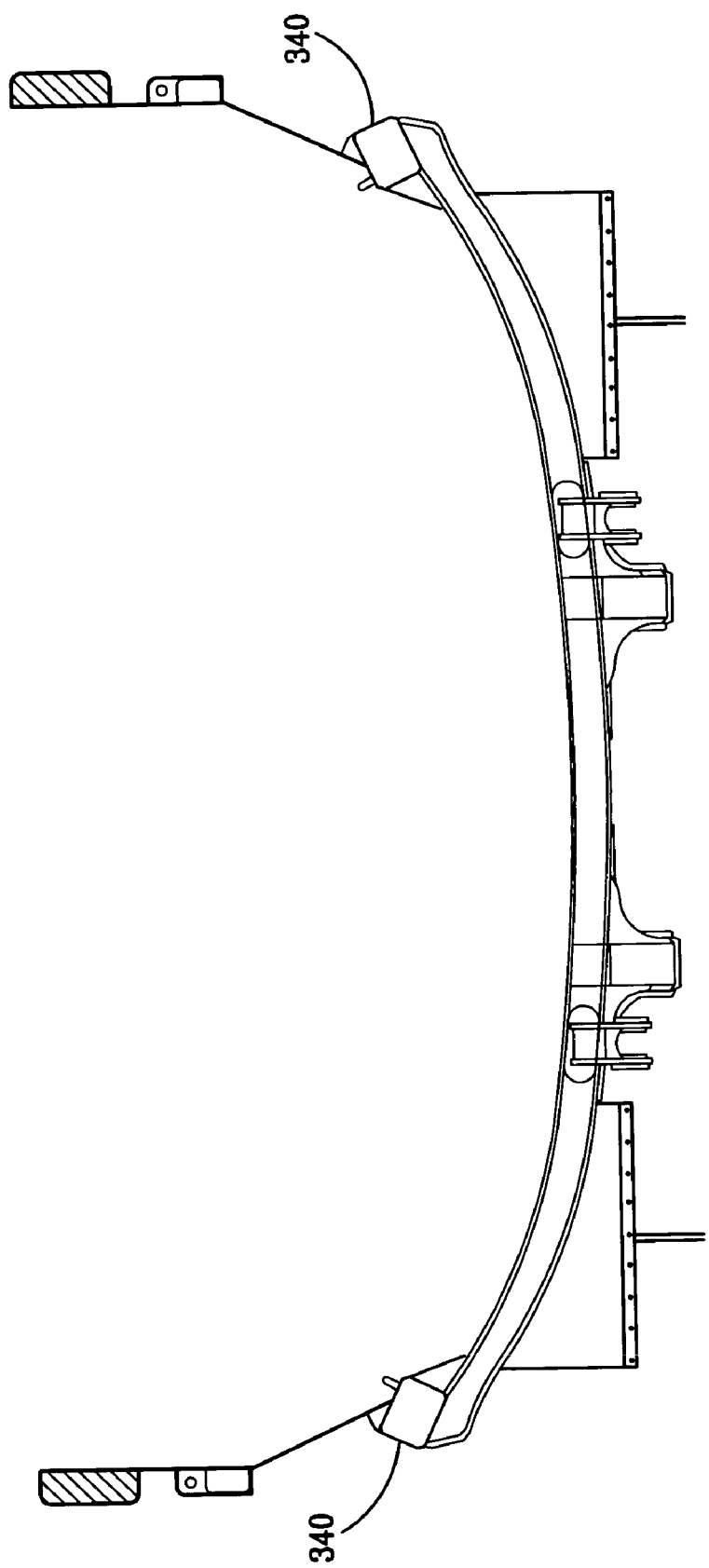
FIG. 4 is a cross-sectional view of the beam and the two side faces of the hopper of the present invention.
Figure 10:
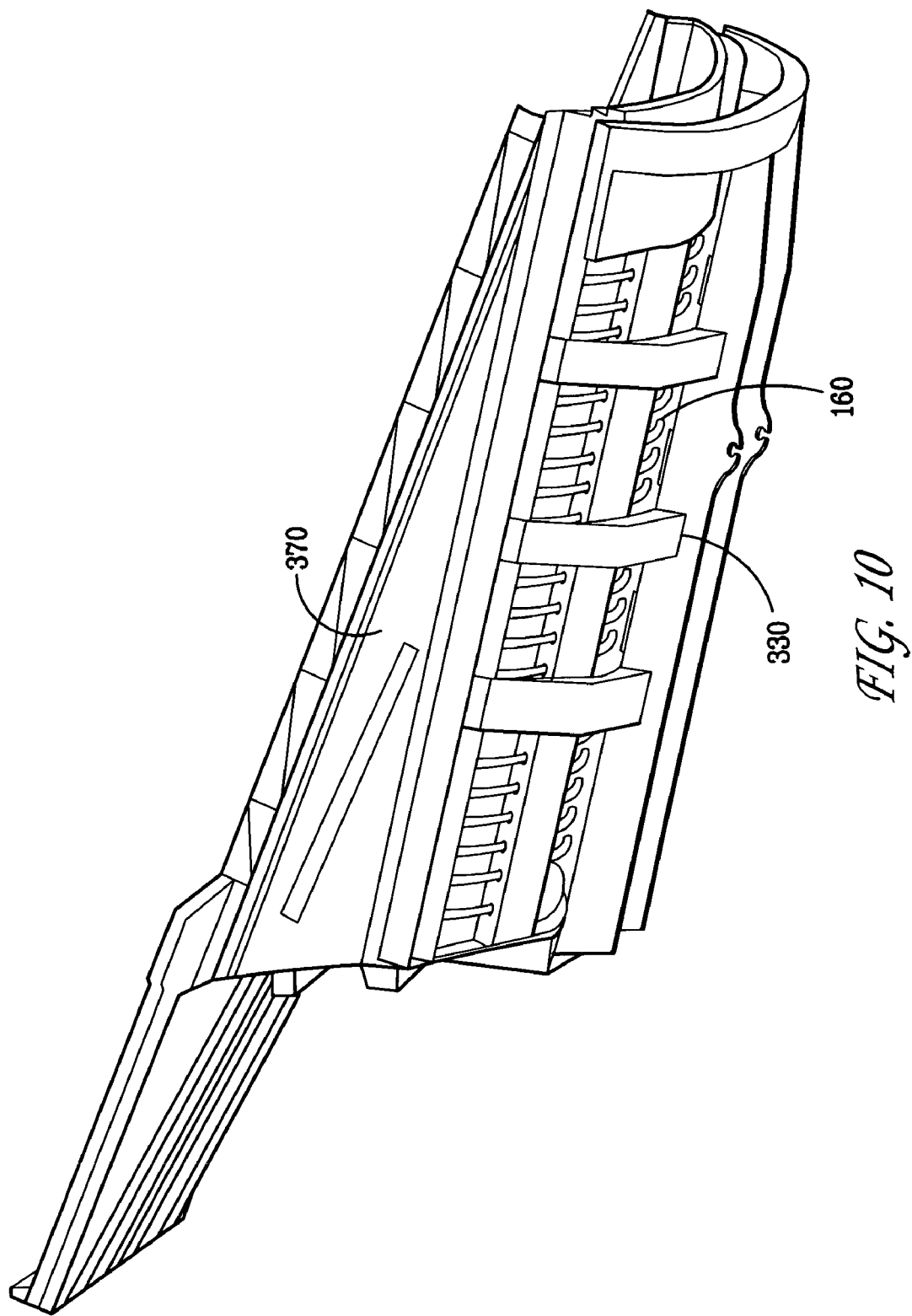
FIG. 10 is a side view of the hopper of the present invention particularly illustrating rubber blocks over the side walls of the hopper.

As regards the hopper's side walls 120, these are in turn made up in their whole upper portion by a "strand" or rubber blocks which become incorporated through such mechanical means as bolt fastening, with a part of its inner body being coated by rubber and allowing for reduction in the steel thickness acting as support (See FIGS. 4 and 10).

In one embodiment, the visor or upper front section of the hopper 140, like the bottom of the hopper, may include a rubber mat hanging over transversal elastomeric ropes, which are in turn adjusted to the edges of visor 140 through a mechanical fastening system and being flanked, if necessary, by adjustable and removable rubber blocks 190, which function to prevent the overflowing of the material transported.

The stress adjustment system or mechanism for the elastomeric ropes 160 is made up of a cast steel latch, through which the elastomeric rope is hooked, held up and stressed by the action of two bolts which, once incorporated to the hopper by the outside, go through the cast portion and form a system which is incorporated with beams 340 in the form of round or square cavities placed in a parallel over the whole length of beams 340. This stress adjustment mechanism allows for adaptation to different types of ore, thus allowing for the optimization of the operation of the same (See FIGS. 6 and 8).

The wear ranges or margins of the rubber mat making up the bottom, the absorbing and shielding outer rubber blocks and of the mat and retaining rubber blocks, which make up the visor and front section, may be monitored at regular specific intervals and their useful life may be accommodated by replacement as necessary. Since these rubber elements are wear resistant and due to the way in which they are fastened to the hopper's body, which make them easily and quickly removable, the regular monitoring of these may indicate damage or excessive wear and once being detected, the component may be repaired quickly and safely.

Among the advantages provided by the present invention is the reduction of the weight of structure 100 by several tons depending on the size of the truck which, combined with the improved hanging of the useful load, gives the possibility of increasing said load without increasing the truck rolling resistance.

Additionally, the present invention provides an excellent solution to the problem of transporting sticky material. The rubber mats in act to prevent or minimize the dirt or gravel from becoming stuck or adhered under cold weather conditions, since it is permanently moving during the transport. During the pouring process, elastomeric ropes 160 return to their original length and bend rubber mat 150, thus forcing out any material which has remained bound at the bottom or in the corners. Wastes of the material transported and adhered to structure 100, are almost completely eliminated according to the present invention.

Another advantage of the present invention is its feature of automatically centering the load. The rubber mat 150, when supported by ropes 160, forms a concave shape and the material loaded in the body tends to rest at the mat's center, thus resulting in a reduction of uneven forces in the structure of chassis and tires. This characteristic allows in turn that the unloading speed decreases with the rubber mat 150 showing a better performance to abrasion characteristic.

An additional advantage of this hopper relates to the health of the operator or driver of the truck. The transmission of vibrations to the cabin during the loading, traveling and unloading is substantially lower than in the case of traditional steel hoppers. Also, the noise of the hopper's loading and unloading is another issue which may affect the environment and which has also received much attention in the industry. It is evident that even a relatively short period of exposure to strong noises may cause a permanent damage to human hearing and to the whole community near these activities. In this respect, and since structure 100 is largely structured in rubber, it absorbs the noise produced during the filling and pouring process. In addition, the ease and safety in connection with the changing of the rubber components make this apparatus preferable in most if not all industrial applications.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

The invention claimed is:

1. A mining hopper for the transport of material comprising:
   at least one steel portion comprising a bottom floor, a plurality of side walls and a front wall;
   at least one rubber or polymer portion;
   wherein said at least one rubber or polymer portion comprises a substantially planar mat varying in thickness over its length and at least one additional planar mat associated with each of said sidewalls and said front wall.

2. The mining hopper of claim 1 wherein said at least one steel portion further comprises a visor portion.

3. The mining hopper of claim 1 further comprising a fastening system for supporting said substantially planar mat.

4. The mining hopper of claim 3 wherein said fastening system comprises a plurality of elastomeric ropes which are located in parallel with one another.

5. The mining hopper of claim 4 wherein said fastening system further comprises at least one clamp and one bolt associated with each said elastomeric rope for adjusting the tension on each of said elastomeric ropes.

6. The mining hopper of claim 1 further comprising a support frame, said support frame comprising a plurality of square-shaped longitudinal beams and a plurality of square-shaped transverse beams, said transverse beams, said transverse beams being perpendicular to said longitudinal beams.

7. The mining hopper of claim 1 wherein said steel portion comprises a front wall and a plurality of side walls.

8. The mining hopper of claim 7 wherein said front wall has a rectangular shape and a hexagon hyperbolic base.

9. The mining hopper of claim 7 wherein said side walls have a substantially triangular shape.

10. The mining hopper of claim 1 further comprising a front wall and wherein the thickness of said planar mat varies such that said planar mat is thinner in an area which is closest to said front wall.

11. The mining hopper of claim 4 wherein said elastomericropes comprise polyester fibers covered with rubber.

12. The mining hopper of claim 1 further comprising at least one removable and adjustable rubber block fastened to said steel portion.

13. A mining hopper for the transport of rock and ores comprising:

a steel portion comprising a bottom floor, a plurality of side walls and a front wall portions formed from polymers;

wherein said portions formed from polymers comprises the body of said mining hoppers said body bearing the impact and wear resulting from the transport of said rocks and ores, and wherein said steel portion functions to fasten and support said portions formed from polymers, said body further comprising a separate body portion, a plurality of separate side walls, a separate front section, and a separate visor all formed from polymers.

14. The mining hopper of claim 13 wherein the bottom portion, plurality of side walls front selection and visor are a combination of steel parts and polymers.

* * * * *

UNITED STATES PATENT AND TRADEMARK OFFICE
CERTIFICATE OF CORRECTION

| | |
|---|---|
| PATENT NO. | : 7,025,407 B2 |
| APPLICATION NO. | : 10/690723 |
| DATED | : April 11, 2006 |
| INVENTOR(S) | : Manuel Antonio Medel |

It is certified that error appears in the above-identified patent and that said Letters Patent is hereby corrected as shown below:

On the front page, Foreign Application Priority Data: reads "73-2003" should read -- 0873-2003 --
Column 7, line 11, reads "beams, said transverse beams, said" should read -- beams, said --
Column 7, line 23-24, read "elastomericropes" should read -- elastomeric ropes --
Column 8, line 8, reads "a front wall portions" should read -- front wall portions --
Column 8, line 10, reads "polymers comprises" should read -- polymers comprise --
Column 8, line 11, reads "mining hoppers said" should read -- mining hopper, said --
Column 8, line 21, reads "side walls front selection" should read -- side walls, front section --

Signed and Sealed this

Twenty-ninth Day of August, 2006

JON W. DUDAS
*Director of the United States Patent and Trademark Office*

(12) EX PARTE REEXAMINATION CERTIFICATE (9984th)
United States Patent
Medel

(10) Number: US 7,025,407 C1
(45) Certificate Issued: Dec. 13, 2013

(54) MINING HOPPER MADE UP OF STEEL AND POLYMERS

(76) Inventor: Manuel Antonio Medel, Santiago (CL)

Reexamination Request:
No. 90/012,619, Sep. 14, 2012

Reexamination Certificate for:
Patent No.: 7,025,407
Issued: Apr. 11, 2006
Appl. No.: 10/690,723
Filed: Oct. 22, 2003

Certificate of Correction issued Aug. 29, 2006

(30) Foreign Application Priority Data

Apr. 30, 2003 (CL) .................................. 0873-2003

(51) Int. Cl.
*B62D 33/02* (2006.01)
(52) U.S. Cl.
USPC ................... 296/183.2; 296/181.3; 296/184.1
(58) Field of Classification Search
USPC ............ 296/36.2, 181.3, 183.1, 183.2, 184.1;
298/1 R, 1 A, 1 B; 105/239, 242, 243,
105/247, 261.1, 375, 423
See application file for complete search history.

(56) References Cited

To view the complete listing of prior art documents cited during the proceeding for Reexamination Control Number 90/012,619, please refer to the USPTO's public Patent Application Information Retrieval (PAIR) system under the Display References tab.

*Primary Examiner* — Russell Stormer

(57) ABSTRACT

A structure, box or hopper for transportation which is formed from a combination of polymers and steels. In one embodiment, polymers comprise the body of the hopper which is in direct contact with the load being transported. In this way, the polymers bear the impact and wear and tear caused by the material being transported. The present invention further comprises various systems for fastening the steel portion of the hopper to the polymeric portion including the use of adjustable elastomeric ropes for supporting a weight bearing rubber mat.

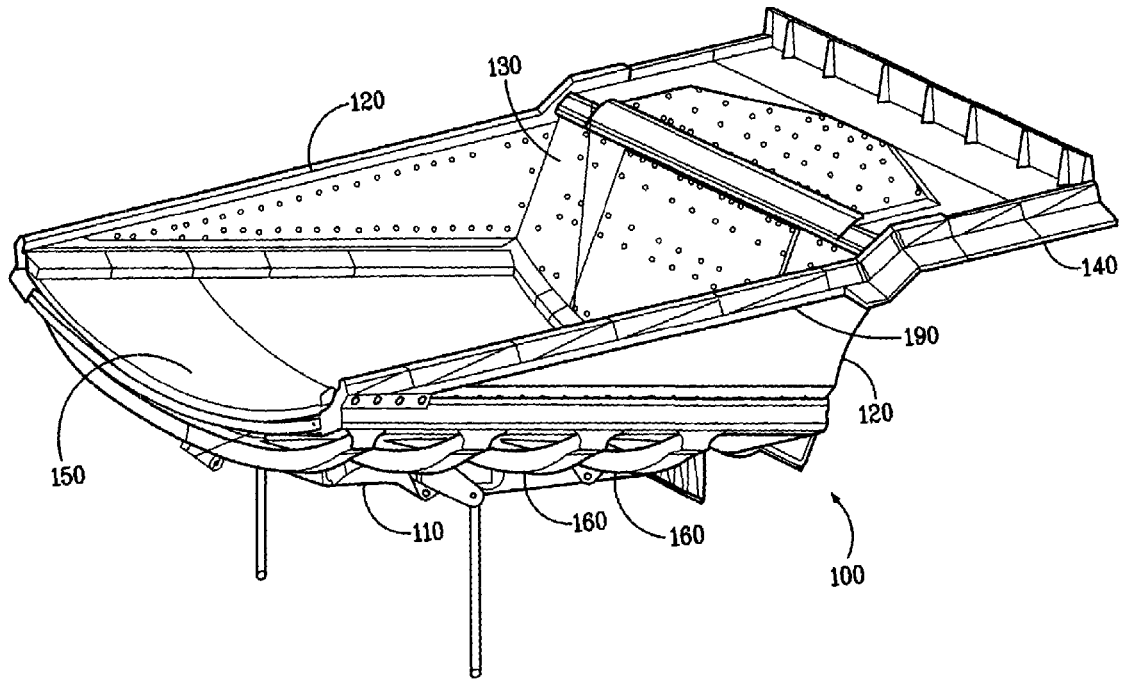

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3 and 5 are cancelled.

Claims 1, 4 and 13 are determined to be patentable as amended.

Claims 2, 6-12 and 14, dependent on an amended claim, are determined to be patentable.

1. A mining hopper for the transport of material comprising:
    at least one steel portion comprising a bottom floor, a plurality of side walls and a front wall;
    at least one rubber or polymer portion[;]*,*
    wherein said at least one rubber or polymer portion comprises a substantially planar mat *forming a bottom of the hopper and* varying in thickness over its length, *having a rear portion which is thickened substantially throughout the width of the mat,* and at least one additional planar mat associated with each of said sidewalls and said front wall*; and*
    *a fastening system to support said substantially planar mat, wherein the fastening system comprises*
    *a plurality of elastomeric ropes,*
    *a plurality of metal boxes configured to enclose an end of each of said plurality of elastomeric roes, wherein each metal box is configured to house an adjustment bolt screwed to a latch supporting the end of each of said plurality of elastomeric ropes, said adjustment bolt to individually adjust a tension on the corresponding elastomeric rope, and further wherein the plurality of metal boxes include a plurality of holes to receive the ends of said plurality of said plurality of elastomeric ropes.*

4. The mining hopper of claim [3] *1* wherein said [fastening system comprises a] plurality of elastomeric ropes [which] are located in parallel with one another.

13. A mining hopper for the transport of rock and ores comprising:
    a steel portion comprising a bottom floor, a plurality of side walls and front wall portions formed from polymers;
    wherein said portions formed from polymers comprise the body of said mining hopper and body bearing the impact and wear resulting from the transport of said rocks and ores, and wherein said steel portion functions to fasten and support said portions formed from polymers, said body further comprising a separate body portion, a plurality of separate side walls, a separate front section, and a separate visor all formed from polymers,
    *and wherein the body portion comprises a floor defined by a rubber or polymer mat having a rear which is thickened substantially throughout a width of the mat; and*
    *a fastening system to support said separate body portion, wherein the fastening system comprises*
    *a plurality of elastomeric ropes,*
    *a plurality of metal boxes configured to enclose an end of each of said plurality of elastomeric ropes, wherein each metal box is configured to house an adjustment bolt screwed to a latch supporting the end of each of said plurality of elastomeric ropes, said adjustment bolt to individually adjust a tension on the corresponding elastomeric rope, and further wherein the plurality of metal boxes includes a plurality of holes to receive the ends of said plurality of elastomeric ropes.*

\* \* \* \* \*